(12) United States Patent
Yamamoto

(10) Patent No.: US 6,634,249 B2
(45) Date of Patent: Oct. 21, 2003

(54) SHIFT ACTUATOR FOR A TRANSMISSION

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/050,969

(22) Filed: Jan. 22, 2002

(65) Prior Publication Data
US 2002/0096008 A1 Jul. 25, 2002

(30) Foreign Application Priority Data
Jan. 22, 2001 (JP) .......................... 2001-013163

(51) Int. Cl.[7] .................... B60K 17/04; B60K 17/12
(52) U.S. Cl. ................ 74/473.12; 74/336 R; 74/473.37
(58) Field of Search .................. 74/335, 336 R, 74/473.12, 473.36, 473.37

(56) References Cited

U.S. PATENT DOCUMENTS

| 3,792,631 | A | * | 2/1974 | Mori | 477/154 |
|---|---|---|---|---|---|
| 5,205,179 | A | * | 4/1993 | Schneider | 74/365 |
| 5,476,424 | A | * | 12/1995 | Fujii et al. | 477/15 |
| 5,689,997 | A | * | 11/1997 | Schaller | 74/335 |
| 6,499,371 | B2 | * | 12/2002 | Tsuzuki et al. | 74/335 |
| 2001/0037698 | A1 | * | 11/2001 | Yamamoto et al. | 74/335 |
| 2002/0096007 | A1 | * | 7/2002 | Yamamoto | 74/473.12 |

* cited by examiner

Primary Examiner—Christopher P. Schwartz
Assistant Examiner—Devon Kramer
(74) Attorney, Agent, or Firm—Antonelli, Terry, Stout & Kraus, LLP

(57) ABSTRACT

A shift actuator for a transmission, which actuates, in a direction of shift, a shift lever of the transmission. The shift actuator includes an operation rod that engages with an operation member linked to the shift lever, a magnetic moving means disposed on the outer peripheral surface of the operation rod, a cylindrical fixed yoke surrounding the magnetic moving member, and a pair of coils arranged on the inside of the fixed yoke neighboring in the axial direction.

4 Claims, 7 Drawing Sheets

SHIFT ACTUATOR FOR A TRANSMISSION

FIELD OF THE INVENTION

The present invention relates to a shift actuator for a transmission, which actuates, in a direction of shift, a shift lever of the transmission mounted on a vehicle.

DESCRIPTION OF THE RELATED ART

As the shift actuator for a transmission, which actuates, in a direction of shift, a shift lever of the transmission, there has been generally used a fluid pressure cylinder that utilizes the fluid pressure such as air pressure or hydraulic pressure as a source of actuation. The shift actuator using the fluid pressure cylinders requires a piping for connecting the source of fluid pressure to the actuators, an electromagnetic change-over valve for changing over the flow passage of the operation fluid, and space for the arrangement thereof, resulting in an increase in the weight of the device as a whole.

In recent years, there has been proposed an actuator constituted by an electric motor as a shift actuator for a transmission mounted on a vehicle which is provided with neither a source of the compressed air nor a source of the hydraulic pressure. The shift actuator constituted by the electric motor needs neither the piping for connection to the source of fluid pressure nor the electromagnetic change-over valve, unlike the actuators that use fluid pressure cylinders, and can, hence, be constituted in a compact size as a whole and in a reduced weight.

The actuator using an electric motor needs a speed reduction mechanism for obtaining a predetermined actuating force. As the speed reduction mechanism, there have been proposed the one using a ball-screw mechanism and the one using a gear mechanism. However, the actuators using the ball-screw mechanism and gear mechanism are not necessarily satisfactory in regard to the durability of the ball-screw mechanism and the gear mechanism and in regard to the durability and the operation speed of the electric motor.

SUMMARY OF THE INVENTION

It is an object of the present invention to provide a shift actuator for a transmission, which features excellent durability and a high operation speed.

In order to achieve the above-mentioned object according to the present invention, there is provided a shift actuator for a transmission, which actuates, in a direction of shift, a shift lever of the transmission, the shift actuator comprising:

an operation rod that engages with an operation member linked to the shift lever;

a magnetic moving means disposed on the outer peripheral surface of the operation rod;

a cylindrical fixed yoke surrounding the magnetic moving means; and a pair of coils arranged on the inside of the fixed yoke neighboring in the axial direction.

The magnetic moving means comprises a moving yoke mounted on the outer peripheral surface of the operation rod, and an annular permanent magnet mounted on the outer peripheral surface of the moving yoke and having magnetic poles in the outer peripheral surface and in the inner peripheral surface thereof, and the moving yoke has a cylindrical portion on which the permanent magnet is mounted and annular flanges formed at both ends of the cylindrical portion, the outer peripheral surfaces of the flanges being constituted to be located close to the inner peripheral surface of the fixed yoke.

Further, the magnetic moving means comprises an intermediate yoke mounted on the outer peripheral surface of the operation rod, a pair of annular permanent magnets disposed each on both sides of the intermediate yoke to hold it therebetween and having magnetic poles in both end surfaces thereof in the axial direction, and a pair of moving yokes disposed each on the outer sides of the pair of permanent magnets in the axial direction thereof, and the pair of moving yokes has annular flanges which are so constituted that the outer peripheral surfaces of said moving yokes are located close to the inner peripheral surface of said fixed yoke.

It is desired that the pair of permanent magnets have their opposing end surfaces magnetized into the same polarity.

DETAILED DESCRIPTION OF THE PREFERRED EMBODIMENTS

Preferred embodiments of the shift actuator for a transmission constituted according to the present invention will now be described in further detail with reference to the accompanying drawings.

Figure 1:
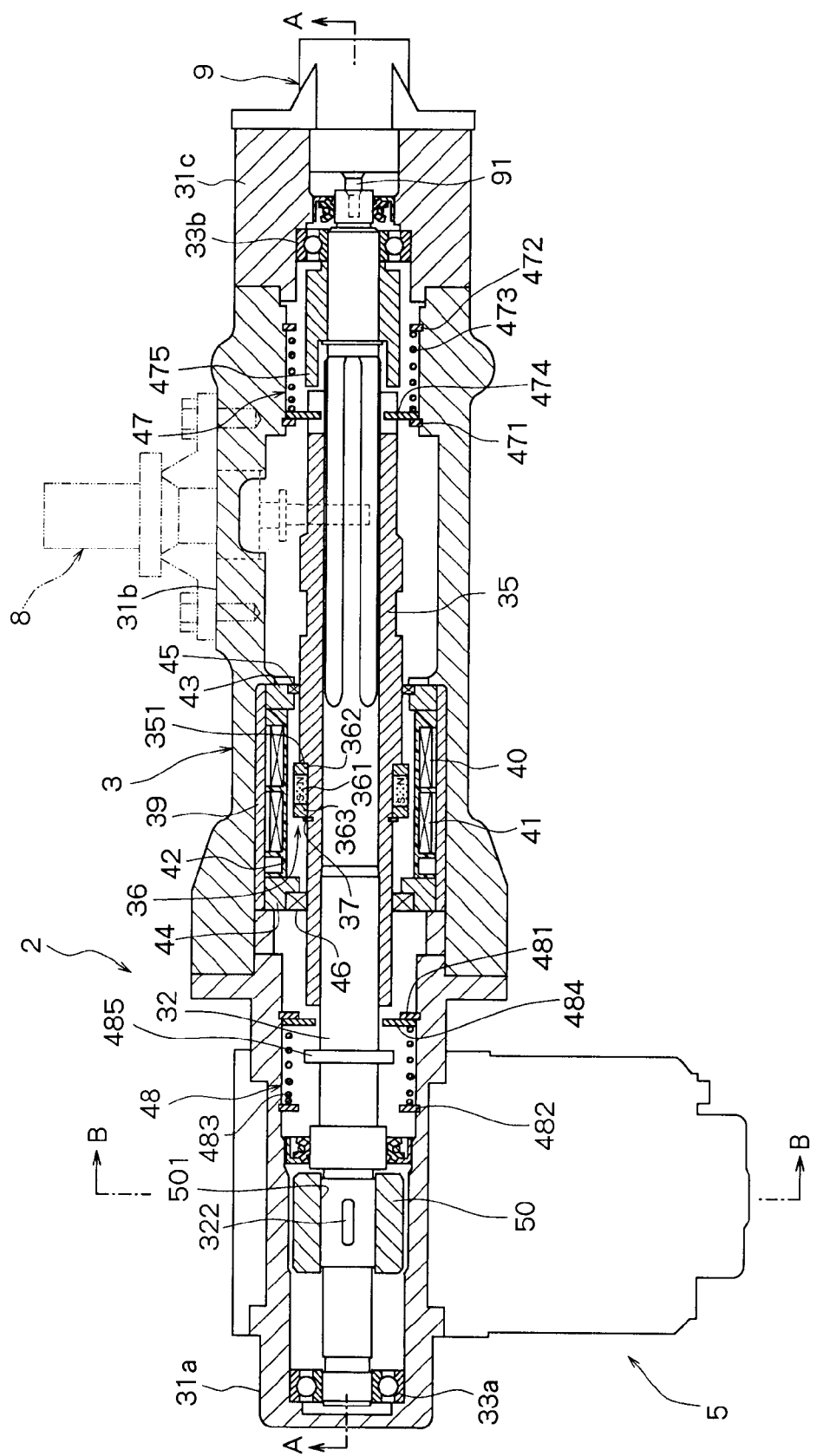
FIG. 1 is a sectional view illustrating a gear change device provided with a shift actuator constituted according to a first embodiment of the present invention.
Figure 2:
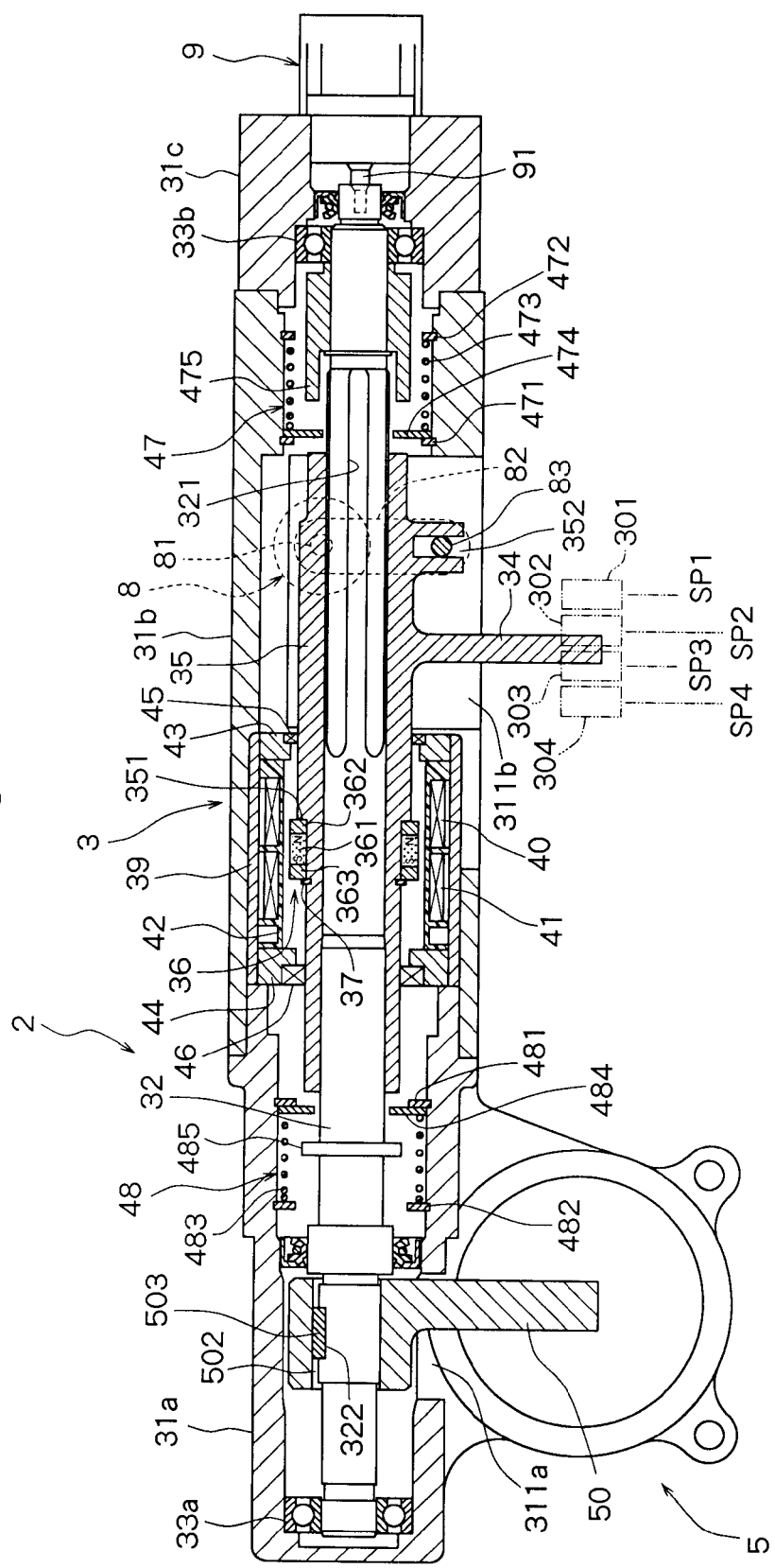
FIG. 2 is a sectional view along the line A—A in FIG. 1.

FIG. 1 is a sectional view illustrating a gear change device provided with a shift actuator constituted according to a first embodiment of the present invention, and FIG. 2 is a sectional view along the line A—A in FIG. 1.

A gear change device 2 according to the illustrated embodiment is constituted by a select actuator 3 and a shift actuator 5. The select actuator 3 has three cylindrical casings 31a, 31b and 31c. A control shaft 32 is arranged in the three casings 31a, 31b and 31c, and both ends of the control shaft 32 are rotatably supported by the casings 31a and 31c on both sides via bearings 33a and 33b. A spline 321 is formed in an intermediate portion of the control shaft 32. A cylindrical shift sleeve 35 constituted integratedly with a shift lever 34 is spline-fitted to the spline 321 so as to slide in the axial direction. The shift lever 34 and the shift sleeve 35 are made of a nonmagnetic material such as a stainless steel, and the shift lever 34 is disposed, being inserted, in an opening 311b formed in a lower portion of the central casing 31b. An end of the shift lever 34 is so constituted as to suitably engage with shift blocks 301, 302, 303 and 304 which are disposed at a first select position SP1, at a second select position SP2, at a third select position SP3 and at a fourth select position SP4 and are constituting a shift mechanism for a transmission that is not shown.

A magnetic moving means 36 is disposed on the outer peripheral surface of the shift sleeve 35. The magnetic moving means 36 is constituted by an annular permanent magnet 361 that is mounted on the outer peripheral surface of the shift sleeve 35 and has magnetic poles in both end surfaces in the axial direction and by a pair of moving yokes 362 and 363 disposed on the outer sides of the permanent magnet 361 in the axial direction thereof. The permanent magnet 361 in the illustrated embodiment is magnetized into an N-pole in the right end surface in FIGS. 1 and 2, and is magnetized into an S-pole in the left end surface in FIGS. 1 and 2. The above pair of moving yokes 362 and 363 is made of a magnetic material in an annular shape. The thus constituted magnetic moving means 36 is positioned at its right end (FIGS. 1 and 2) of the one moving yoke 362 (right side in FIGS. 1 and 2) by a step 351 formed in the shift sleeve 35, and is positioned at its left end (FIGS. 1 and 2) of the other moving yoke 363 (left side in FIGS. 1 and 2) by a snap ring 37 fitted to the shift sleeve 35, so that the motion in the axial direction thereof is limited. A fixed yoke 39 is disposed on the outer peripheral side of the magnetic moving means 36 to surround the magnetic moving means 36. The fixed yoke 39 is made of a magnetic material in a cylindrical shape and is mounted on the inner peripheral surface of the central casing 31b. A pair of coils 40 and 41 is arranged on the inside of the fixed yoke 39. The pair of coils 40 and 41 is wound on a bobbin 42 made of a nonmagnetic material such as a synthetic resin and is mounted on the inner peripheral surface of the fixed yoke 39. The pair of coils 40 and 41 is connected to a power source circuit that is not shown. The length of the coil 40 in the axial direction nearly corresponds to a length of selection from the first select position SP1 up to the fourth select position SP4. End walls 43 and 44 are mounted on both sides of the fixed yoke 39. On the inner periphery of the end walls 43 and 44 are mounted sealing members 45 and 46 that come in contact with the outer peripheral surface of the shift sleeve 35.

The select actuator 3 is constituted as described above, and works based on a principle of a linear motor that is constituted by the magnetic moving means 36 disposed on the shift sleeve 35 that serves as the shift lever support member, by the fixed yoke 39 and by the pair of coils 40 and 41. The operation will now be described with reference to FIG. 3.

Figure 3A:
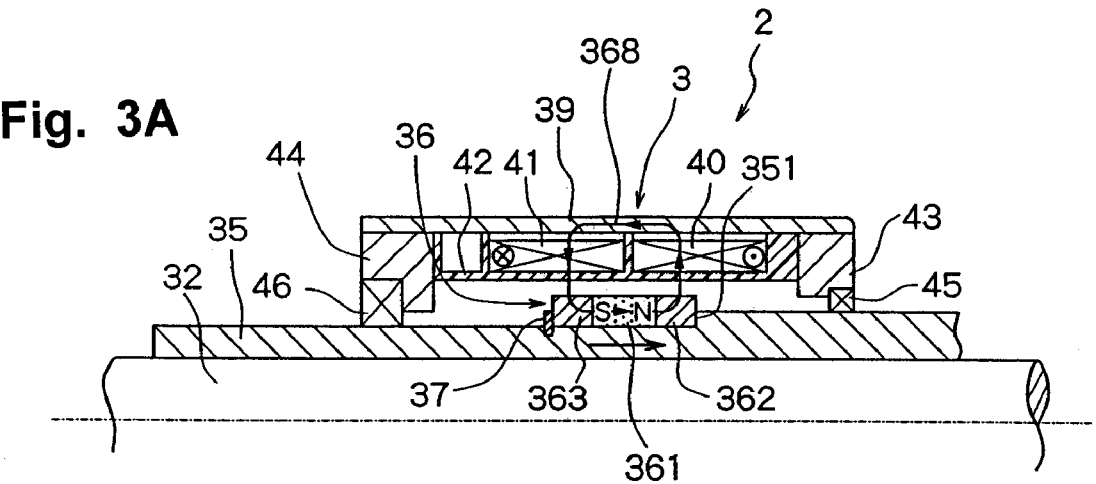
FIG. 3 is a view illustrating the operation of a select actuator that constitutes the gear change device shown in FIG. 1.
Figure 3B:
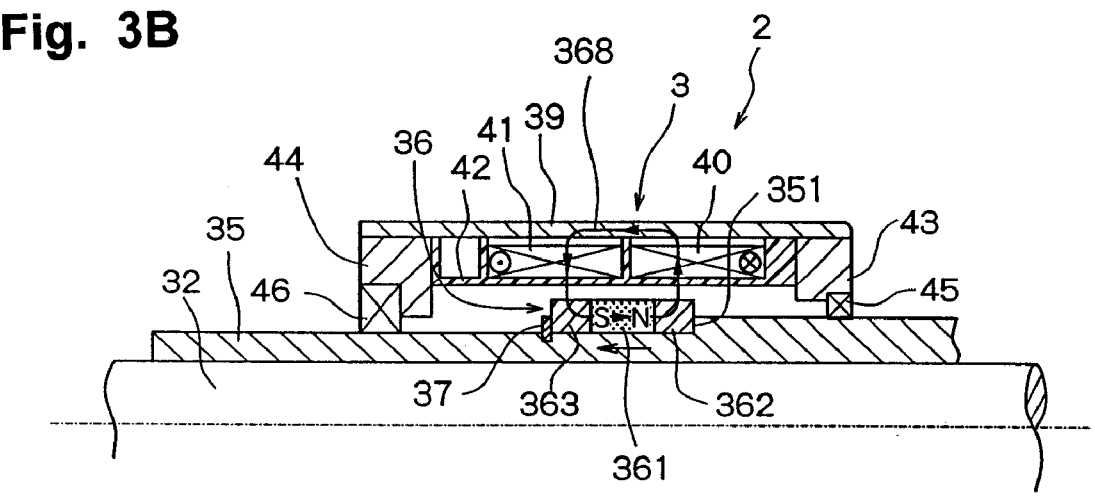

In the select actuator 3 according to the first embodiment, there is established a magnetic circuit 368 passing through the N-pole of permanent magnet 361, one moving yoke 362, one coil 40, fixed yoke 39, the other coil 41, the other moving yoke 363 and S-pole of permanent magnet 361, as shown in FIGS. 3(a) and 3(b). In this state, when electric currents are supplied to the pair of coils 40 and 41 in directions opposite to each other as shown in FIG. 3(a), a thrust toward the right is produced by the permanent magnet 361, i.e., produced by the shift sleeve 35, as indicated by an arrow in FIG. 3(a) in accordance with the Fleming's left-hand rule. As shown in FIG. 3(b), on the other hand, when the electric currents are supplied to the pair of coils 40 and 41 in the directions just opposite to the directions of FIG. 3(a), a thrust toward the left is produced by the permanent magnet 361, i.e., produced by the shift sleeve 35, as indicated by an arrow in FIG. 3(b) in accordance with the Fleming's left-hand rule. The magnitude of thrust produced by the permanent magnet 361, i.e., produced by the shift sleeve 35, is determined by the amount of electric power supplied to the pair of coils 40 and 41.

The actuator 3 in the illustrated embodiment has a first select position-limiting means 47 and a second select position-limiting means 48 for limiting the position of the shift lever 34 to the first select position SP1, second select position SP2, third select position SP3 or fourth select position SP4 in cooperation with the magnitude of thrust acting on the magnetic moving means 36, i.e., acting on the shift sleeve 35. The first select position-limiting means 47 comprises snap rings 471 and 472 fitted to right end portions (in FIGS. 1 and 2) of the central casing 31b at a predetermined interval, a compression coil spring 473 disposed between the snap rings 471 and 472, a moving ring 474 disposed between the compression coil spring 473 and one snap ring 471, and a stopper 475 for limiting the motion of the moving ring 474 by coming in contact therewith when the moving ring 474 is moved toward the right in FIGS. 1 and 2 by a predetermined amount.

When in a state as shown in FIGS. 1 and 2, a current is supplied to the pair of coils 40 and 41 at a voltage of, for example, 2.4 V as shown in FIG. 3(a), the thus constituted first select position-limiting means 47 so works that the magnetic moving means 36 moves, i.e., the shift sleeve 35 moves, toward the right in FIGS. 1 and 2, and the right end of the shift sleeve 35 in FIGS. 1 and 2 comes in contact with the moving ring 474 to be limited for its position. In this state, the resilient force of the coil spring 473 has been set to be larger than the thrust that acts on the permanent magnet 361, i.e., that acts on the shift sleeve 35. Therefore, the shift sleeve 35 in contact with the moving ring 474 is brought into a halt at a position where the moving ring 474 is in contact with the one snap ring 471. In this case, the shift lever 34 constituted integratedly with the shift sleeve 35 is brought to the second select position SP2. Next, when the current is supplied to the pair of coils 40 and 41 at a voltage of, for example, 4.8 V as shown in FIG. 3(a), the thrust acting on the magnetic moving means 36, i.e., acting on the shift sleeve 35 has been set so as to become larger than the resilient force of the coil spring 473. Accordingly, the shift sleeve 35 that has come in contact with the moving ring 474, then, moves toward the right in FIGS. 1 and 2 against the resilient force of the coil spring 473, and the moving ring 474 is brought into a halt at a position where the moving ring 474 comes in contact with the stopper 475. At this moment, the shift lever 34 constituted integratedly with the shift sleeve 35 is brought to the first select position SP1.

Next, the second select position-limiting means 48 will be described.

The second select position-limiting means 48 comprises snap rings 481 and 482 fitted to left end portions (in FIGS. 1 and 2) of the central casing 31b at a predetermined interval, a coil spring 483 disposed between the snap rings 481 and 482, a moving ring 484 disposed between the coil spring 483 and one snap ring 481, and a stopper 485 for limiting the motion of the moving ring 484 by coming in contact therewith when the moving ring 484 is moved toward the left in FIGS. 1 and 2 by a predetermined amount.

When in a state as shown in FIGS. 1 and 2, a current is supplied to the pair of coils 40 and 41 at a voltage of, for example, 2.4 V as shown in FIG. 3(b), the thus constituted second select position-limiting means 48 so works that the permanent magnet 361 moves, i.e., the shift sleeve 35 moves toward the left in FIGS. 1 and 2, and the left end of the shift sleeve 35 comes in contact with the moving ring 484 in FIGS. 1 and 2 to be limited for its position. In this state, the resilient force of the coil spring 483 has been set so as to be larger than the thrust that acts on the permanent magnet 361, i.e., that acts on the shift sleeve 35. Therefore, the shift sleeve 35 in contact with the moving ring 484 is brought into a halt at a position where the moving ring 484 is in contact with the one snap ring 481. In this case, the shift lever 34 constituted integratedly with the shift sleeve 35 is brought to the third select position SP3. Next, when the current is supplied to the pair of coils 40 and 41 at a voltage of, for example, 4.8 V as shown in FIG. 3(b), the thrust acting on the permanent magnet 361, i.e., acting on the shift sleeve 35 has been set so as to become larger than the resilient force of the coil spring 483. Accordingly, the shift sleeve 35 that has come in contact with the moving ring 484, then, moves toward the left in FIGS. 1 and 2 against the resilient force of the coil spring 483, and the moving ring 484 is brought into a halt at a position where the moving ring 484 comes in contact with the stopper 485. At this moment, the shift lever 34 constituted integratedly with the shift sleeve 35 is brought to the fourth select position SP4.

As described above, according to the illustrated embodiment provided with the first select position-limiting means 47 and with the second select position-limiting means 48, the shift lever 34 can be brought to a predetermined select position by controlling the amount of electric power supplied to the pair of coils 40 and 41 without executing the position control operation.

The gear change device according to the illustrated embodiment has a select position sensor 8 for detecting the position of the shift sleeve 35 constituted integratedly with the shift lever 34, i.e., for detecting the position thereof in the direction of selection. The select position sensor 8 comprises a potentiometer, and a rotary shaft 81 thereof is attached to an end of a lever 82. An engaging pin 83 attached to the other end of the lever 82 is brought into engagement with an engaging groove 352 formed in the shift sleeve 35. Therefore, as the shift sleeve 35 moves toward the right or left in FIG. 2, the lever 82 swings on the rotary shaft 81 as a center, and the rotary shaft 81 rotates to detect the operation position of the shift sleeve 35, i.e., to detect the position thereof in the direction of selection. In response to a signal from the select position sensor 8, the shift lever 34 is brought to a desired select position by controlling the voltage and the direction of current supplied to the coils 40 and 41 of the select actuator 3 by using a control means which is not shown.

Further, the gear change device 2 of the illustrated embodiment has a shift stroke position sensor 9 for detecting the rotational position, i.e., for detecting the shift stroke position of the control shaft 32 mounting the shift sleeve 35 constituted integratedly with the shift lever 34. The shift stoke position sensor 9 comprises a potentiometer with its rotary shaft 91 being linked to the control shaft 32. When the control shaft 32 rotates, therefore, the rotary shaft 91 rotates to detect the rotational position, i.e., to detect the shift stroke position, of the control shaft 32.

Next, the shift actuator constituted according to the first embodiment of the present invention will be described with reference chiefly to FIG. 4 which is a sectional view along the line B—B in FIG. 1.

Figure 4:
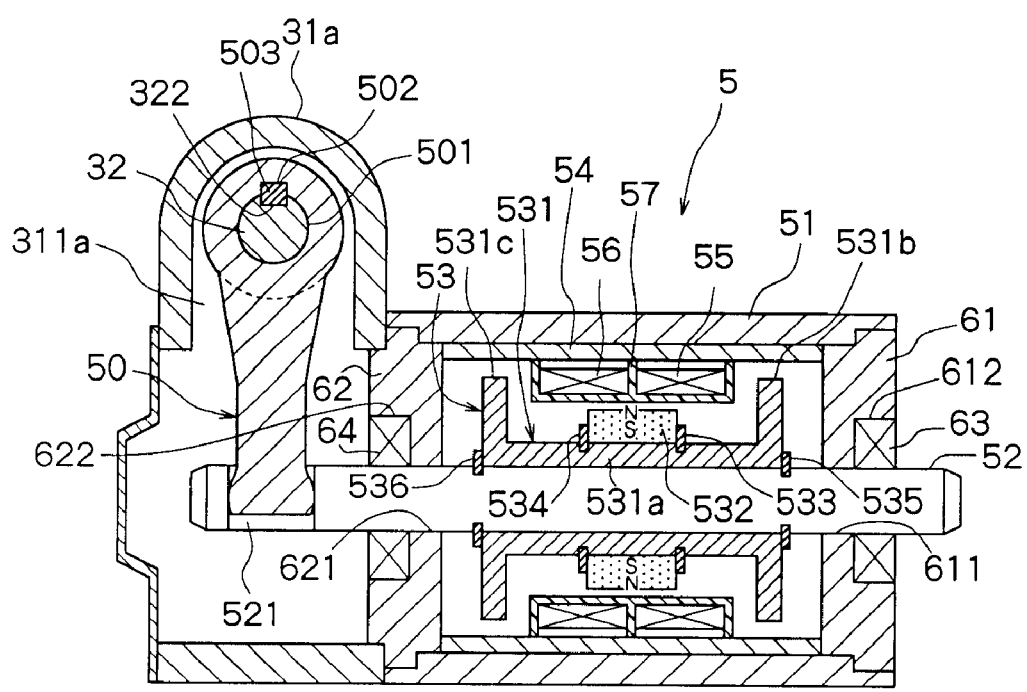
FIG. 4 is a sectional view along the line B—B in FIG. 1.

The shift actuator 5 according to the first embodiment shown in FIG. 4 comprises a casing 51, an operation rod 52 that engages with an operation lever 50 mounted on a control shaft 32 disposed in the central portion of the casing 51 and in the casings 31a, 31b, 31c of the select actuator 3, a magnetic moving means 53 disposed on the outer peripheral surface of the operation rod 52, a cylindrical fixed yoke 54 disposed on the inside of the casing 51 to surround the magnetic moving means 53, and a pair of coils 55 and 56 provided on the inside of the fixed yoke 54 neighboring in the axial direction. The operation lever 50 that engages with the operation rod 52 has a hole 501 formed in the base portion thereof so as to be fitted to the control shaft 32. By fitting a key 503 to a key groove 502 formed in the inner peripheral surface of the hole 501 and to a key groove 322 formed in the outer peripheral surface of the control shaft 32, the operation lever 50 turns integratedly with the control shaft 32. The operation lever 50 works as an operation member which is linked to the shift lever 34 via the control shaft 32 and the shift sleeve 35, and is disposed being inserted in the opening 311a formed in the lower part of the casing 31a which is on the left side in FIGS. 1 and 2.

In the illustrated embodiment, the casing 51 is formed in a cylindrical shape by using a nonmagnetic material such as a stainless steel or an aluminum alloy. The operation rod 52 is made of a nonmagnetic material such as a stainless steel, and has a groove 521 formed at a left end portion thereof in FIG. 4, the groove 521 being constituted so as to be engaged with an end of the operation lever 50.

The magnetic moving means 53 comprises a moving yoke 531 mounted on the outer peripheral surface of the operation rod 52, and an annular permanent magnet 532 disposed on the outer peripheral surface of the moving yoke 531 so as to be faced the inner peripheral surfaces of the pair of coils 55 and 56. The moving yoke 531 is made of a magnetic material, and has a cylindrical portion 531a on which a permanent magnet 532 is mounted, and annular flanges 531b and 531c formed at both ends of the cylindrical portion 531a, the outer peripheral surfaces of the flanges 531b and 531c being located close to the inner peripheral surface of the fixed yoke 54. It is desired that the gap between the outer peripheral surfaces of the flanges 531b, 531c and the inner peripheral surface of the fixed yoke 54 be as small as possible. By taking errors in the production and the like into consideration, however, the gap in the illustrated embodiment is set to be 0.5 mm. The thus constituted moving yoke 531 is limited from moving in the axial directions by snap rings 535 and 536 respectively mounted on the operation rod 52 on both sides thereof. The permanent magnet 532 has magnetic poles in the outer peripheral surface and in the inner peripheral surface thereof. In the illustrated embodiment, the N-pole is formed in the outer peripheral surface and the S-pole is formed in the inner peripheral surface. The thus formed permanent magnet 532 is mounted on the outer peripheral surface of the cylindrical portion 531a of the moving yoke 531 and is limited from moving in the axial direction by snap rings 533 and 534 respectively mounted on the cylindrical portion 531a of the moving yoke 531 on both sides thereof.

The fixed yoke 54 is mounted on the inner peripheral surface of the casing 51 formed of the magnetic material. The pair of coils 55 and 56 is wound on a bobbin 57 that is made of a nonmagnetic material such as a synthetic resin and is mounted on the inner peripheral surface of the fixed yoke 54. The pair of coils 55 and 56 is connected to a power source circuit that is not shown. The length of the pair of coils 55 and 56 in the axial direction is suitably set according to the operation stroke of the shift actuator 5.

End walls 61 and 62 are mounted on both sides of the casing 51. The end walls 61 and 62 are formed of a stainless steel or an aluminum alloy, or a nonmagnetic material such as a synthetic resin, and have holes 611 and 621 formed in the central portions thereof to permit the insertion of the operation rod 52. The operation rod 52 inserted in the holes 611 and 621 is supported by the inner peripheral surfaces of the holes 611 and 521 slidably in the axial direction.

Cut-away portions 612 and 622 are formed in the inner peripheral portions of the end walls 61 and 62 on the outer sides thereof, and sealing members 63 and 64 are fitted into the cut-away portions 612 and 622.

The shift actuator 5 according to the first embodiment is constituted as described. The operation will now be described with reference to FIG. 5.

In the shift actuator 5 as shown in FIGS. 5(a) to 5(d), a first magnetic flux circuit 537 and a second magnetic flux circuit 538 are formed by the permanent magnet 532. That is, in the shift actuator 5 of the illustrated embodiment, there are established a first magnetic circuit 537 passing through the N-pole of the permanent magnet 532, one coil 55 of the pair of coils, fixed yoke 54, flange 531b of the moving yoke 531, cylindrical portion 531a of the moving yoke 531 and S-pole of the permanent magnet 532, and a second magnetic circuit 538 passing through the N-pole of the permanent magnet 532, the other coil 56 of the pair of coils, fixed yoke 54, flange 531c of the moving yoke 531, cylindrical portion 531a of the moving yoke 531 and S-pole of the permanent magnet 532.

Figure 5A:
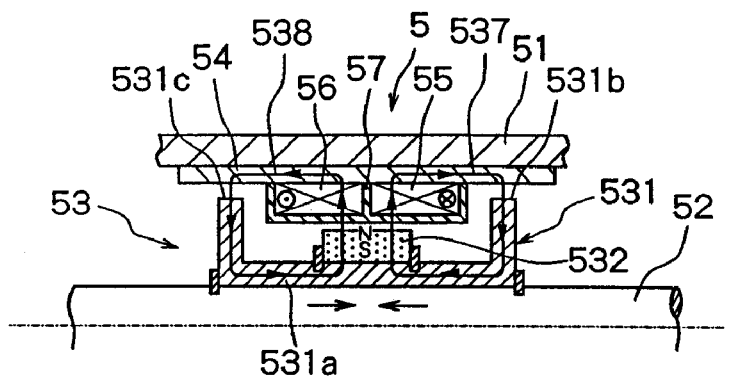
FIG. 5 is a view illustrating the operation states of the shift actuator according to the first embodiment shown in FIG. 4.

When the electric currents are supplied into the pair of coils 55 and 56 in the directions opposite to each other as shown in FIG. 5(a) in a state where the operation rod 52 is at the neutral position shown in FIG. 5(a), thrusts are produced on the magnetic moving means 53, i.e., on the operation rod 52 according to the Fleming's left-hand rule in the directions to cancel each other as indicated by arrows. Therefore, the operation rod 52 is maintained at the neutral position shown in FIGS. 4 and 5(a).

Figure 5B:
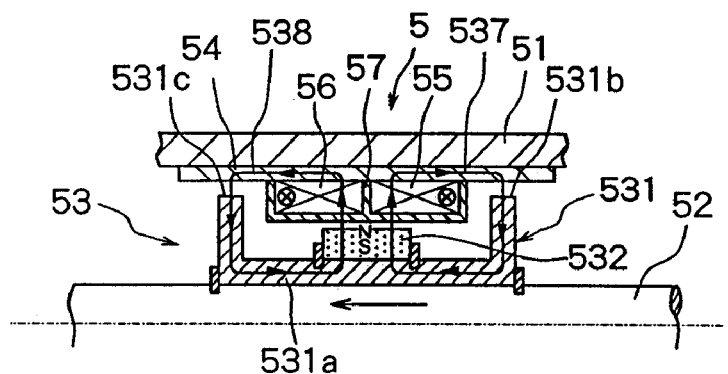

Next, when the electric currents are supplied to the pair of coils 55 and 56 in the same direction as shown in FIG. 5(b) in a state where the operation rod 52 is at the neutral position, the thrust is produced on the magnetic moving means 53, i.e., on the operation rod 52 toward the left as indicated by an arrow in FIG. 5(b). As a result, the operation rod 52 moves toward the left in FIG. 4, whereby the control shaft 32 rotates clockwise in FIG. 4 via the operation lever 50 which is engaged at its end with the operation rod 52. Accordingly, the shift lever 34 constituted integratedly with the shift sleeve 35 mounted on the control shaft 32, is shifted in one direction.

Figure 5C:
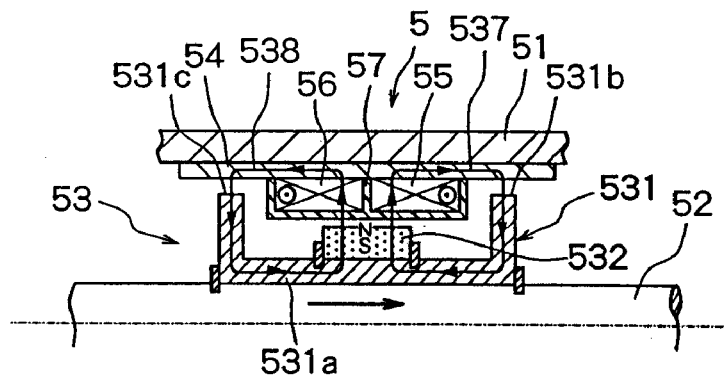

When the electric currents are supplied to the pair of coils 55 and 56 in the direction opposite to the direction of FIG. 5(b) as shown in FIG. 5(c) in a state where the operation rod 52 is at the neutral position, the thrust is produced on the magnetic moving means 53, i.e., on the operation rod 52 toward the right as indicated by an arrow in FIG. 5(c). As a result, the operation rod 52 moves toward the right in FIG. 4, whereby the control shaft 32 rotates counterclockwise in FIG. 4 via the operation lever 50. Accordingly, the shift lever 34 constituted integratedly with the shift sleeve 35 mounted on the control shaft 32, is shifted in the other direction.

Figure 5D:
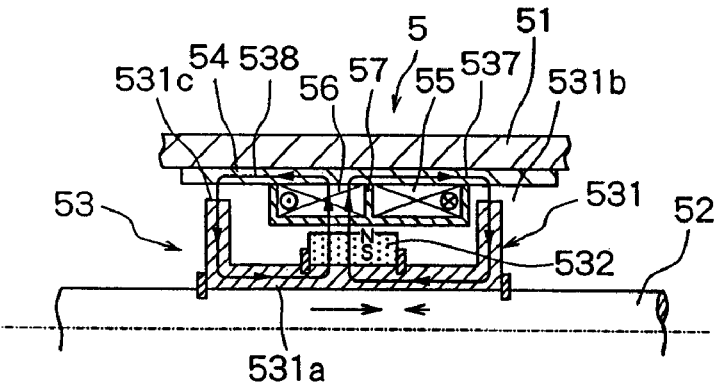

On the other hand, when the electric currents are supplied to the pair of coils 55 and 56 in the directions opposite to each other as shown in FIG. 5(d) in a state where the operation rod 52 has been moved toward the left in FIG. 4, the thrusts are produced on the magnetic moving means 53, i.e., on the operation rod 52 in the directions to cancel each other as indicated by an arrows. Here, in the state where the operation rod 52 has been moved toward the left, i.e., the magnetic moving means 53 has been moved toward the left, there is produced magnetic fluxes that passes through the coil due to the first magnetic flux circuit 537 and the second magnetic flux circuit 538 established by the permanent magnet 532. In this case, however, the amount of magnetic flux passing through the coil 56 is larger than the amount of magnetic flux passing through the coil 55. Therefore, the thrust toward the right produced on the magnetic moving means 53, i.e., produced on the operation rod 52 as a result of supplying electric current to the other coil 56 in the direction shown in FIG. 5(d), becomes greater than the thrust toward the left produced on the magnetic moving means 53, i.e., produced on the operation rod 52 as a result of supplying electric current to one coil 55 in the direction shown in FIG. 5(d). As a result, the operation rod 52 moves toward the right in FIG. 5(d). Thus, when the operation rod 52 moves toward the right in FIG. 5(d), the amount of magnetic flux passing through the coil 55 decreases and the amount of magnetic flux passing through the coil 56 increases as it approaches neutral position. When the operation rod 52 has reached the neutral position, the amount of magnetic flux passing through the coil 55 becomes equal to the amount of magnetic flux passing through the coil 56. As a result, the leftward thrust becomes equal to the rightward thrust on the operation rod 52; i.e., the operation rod 52 comes into a halt at the neutral position.

In the shift actuator 5 according to the first embodiment as described above, the operation rod 52 operates based on the principle of a linear motor which is constituted by the magnetic moving means 53, fixed yoke 54 and the pair of coils 55 and 56, featuring improved durability since there is employed no rotary mechanism. Unlike the actuator using an electric motor, further, the shift actuator 5 of the first embodiment requires no speed reduction mechanism which is based on the ball-screw mechanism or the gear mechanism, and can, hence, be constituted in a compact size and operates at an increased speed. In the shift actuator 5 of the first embodiment, further, the flanges 531a and 531c of the moving yoke 531 constituting the magnetic moving means 53 have outer peripheral surfaces which are located close to the inner peripheral surface of the fixed yoke 54. Therefore, a large gap to the magnetic flux is formed by the coils 55 and 56 only, and the air gap is minimized in the first magnetic flux circuit 537 and in the second magnetic flux circuit 538 established by the permanent magnet 532, making it possible to produce a large thrust.

Next, a second embodiment of the shift actuator constituted according to the present invention will be described with reference to FIGS. 6 and 7.

Figure 6:
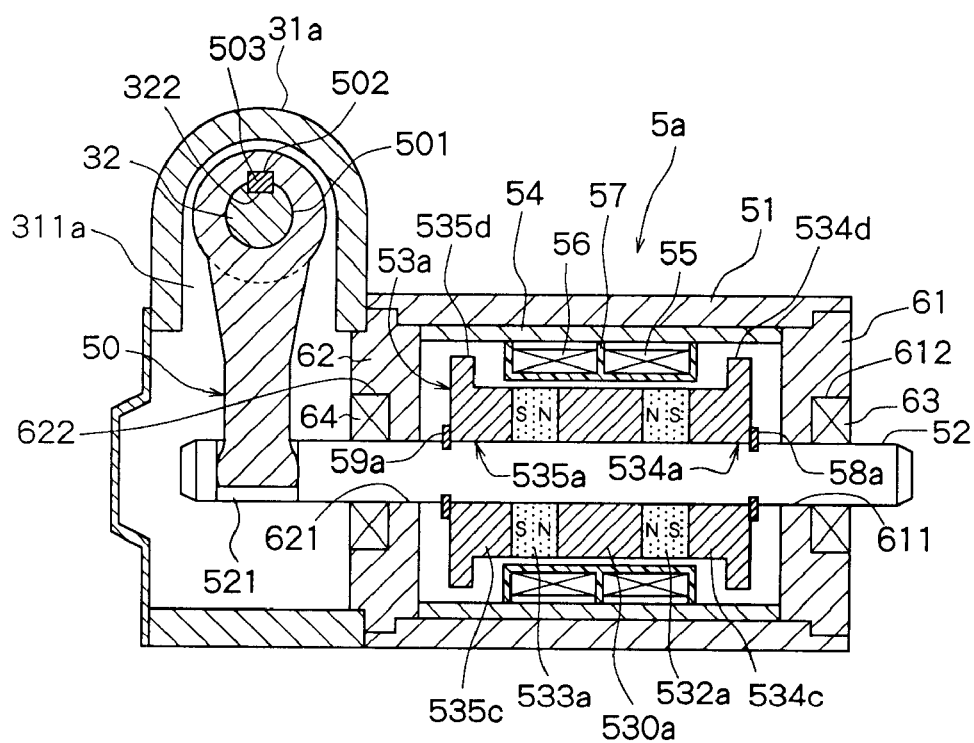
FIG. 6 is a sectional view illustrating the shift actuator constituted according to a second embodiment of the present invention.

The shift actuator 5a according to the second embodiment shown in FIG. 6 has a magnetic moving means 53a disposed on the operation rod 52, which is different from the magnetic moving means 53 of the shift actuator 5 of the first embodiment. Other constituent members, however, may be substantially the same as those of the shift actuator 5 of the first embodiment. In FIG. 6, therefore, the same constituent members as those constituting the shift actuator 5 of the first embodiment are denoted by the same reference numerals.

The magnetic moving means 53a constituting the shift actuator 5a of the second embodiment includes an intermediate yoke 530a disposed on the outer peripheral surface of the operation rod 52 so as to be opposed to the inner peripheral surfaces of the pair of coils 55 and 56, a pair of permanent magnets 532a and 533a disposed on both sides of the intermediate yoke 530a to hold it therebetween, and a pair of moving yokes 534a and 535a disposed on the outer sides of the pair of permanent magnets 532a and 533a in the axial direction thereof. The intermediate yoke 531 is made of a magnetic material in an annular shape. The pair of permanent magnets 532a and 533a has magnetic poles in both end surfaces in the axial direction thereof. In the illustrated embodiment, the N-pole is formed in the opposing end surfaces, and the S-pole is formed in the end surfaces on the outer sides in the axial direction thereof. The pair of moving yokes 534a and 535a is made of a magnetic material, and has cylindrical portions 534c and 535c and annular flanges 534d and 535d formed at the outer ends of the cylindrical portions 534c and 535c in the axial direction, respectively. The outer peripheral surfaces of the flanges 534d and 535d are located close to the inner peripheral surface of the fixed yoke 54. The gap between the outer peripheral surfaces of the flanges 534d, 535d and the inner peripheral surface of the fixed yoke 54 is set to be 0.5 mm, like that of the shift actuator 5 of the above-mentioned first embodiment. The above-mentioned pair of moving yokes 534a and 535a, in the illustrated embodiment, is constituted by the cylindrical portions 534c, 535c and by the flanges 534d, 535d. The pair of moving yokes, however, may be constituted by the flanges only having the outer peripheral surfaces located close to the inner peripheral surface of the fixed yoke 54. The thus constituted pair of moving yokes 534a and 535a is limited from moving in the axial direction by snap rings 58a and 59a mounted on the operation rod 52 on the outer sides thereof in the axial direction.

The shift actuator 5a according to the second embodiment is constituted as described. The operation will now be described with reference to FIG. 7.

In the shift actuator 5a according to the second embodiment as shown in FIGS. 7(a) to 7(d), a first magnetic flux circuit 537a and a second magnetic flux circuit 538a are formed by the pair of permanent magnets 532a and 533a.

Figure 7A:
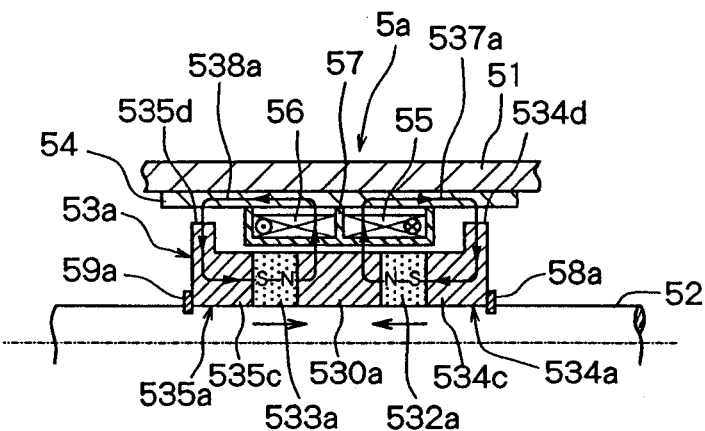
FIG. 7 is a view illustrating the operation states of the shift actuator according to the second embodiment shown in FIG. 5.

When the electric currents are supplied into the pair of coils 55 and 56 in the directions opposite to each other as shown in FIG. 7(a) in a state where the operation rod 52 is at the neutral position shown in FIG. 7(a), thrusts are produced on the magnetic moving means 53a, i.e., on the operation rod 52, according to the Fleming's left-hand rule in the directions to cancel each other as indicated by arrows. Therefore, the operation rod 52 is maintained at the neutral position shown in FIGS. 6 and 7(a).

Figure 7B:
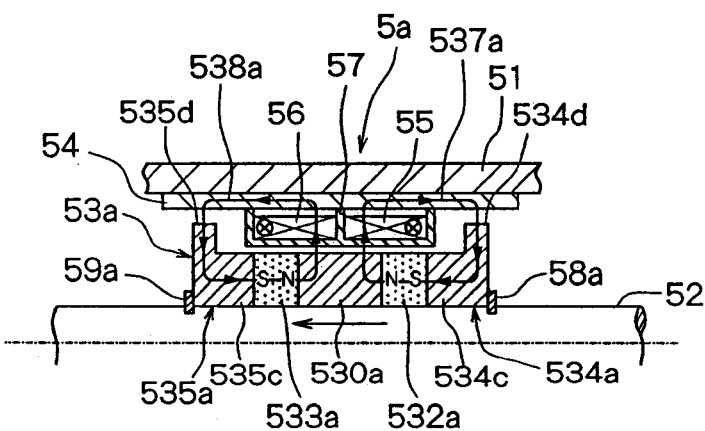

Next, when the electric currents are supplied to the pair of coils 55 and 56 in the same direction as shown in FIG. 7(b) in a state where the operation rod 52 is at the neutral position, the thrust is produced on the magnetic moving means 53a, i.e., on the operation rod 52, toward the left as indicated by an arrow in FIG. 7(b). As a result, the operation rod 52 moves toward the left in FIG. 7(b).

Figure 7C:
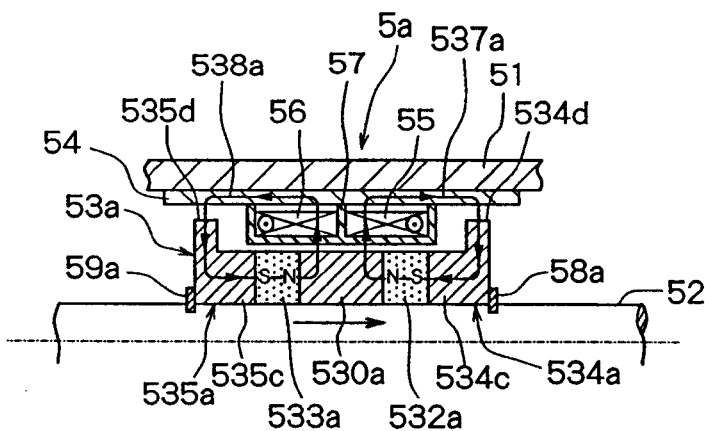

When the electric currents are supplied to the pair of coils 55 and 56 in the direction opposite to the direction of FIG. 7(b) as shown in FIG. 7(c) in a state where the operation rod 52 is at the neutral position, the thrust is produced on the magnetic moving means 53a, i.e., on the operation rod 52, toward the right as indicated by an arrow in FIG. 7(c). As a result, the operation rod 52 moves toward the right in FIG. 7(c).

Figure 7D:
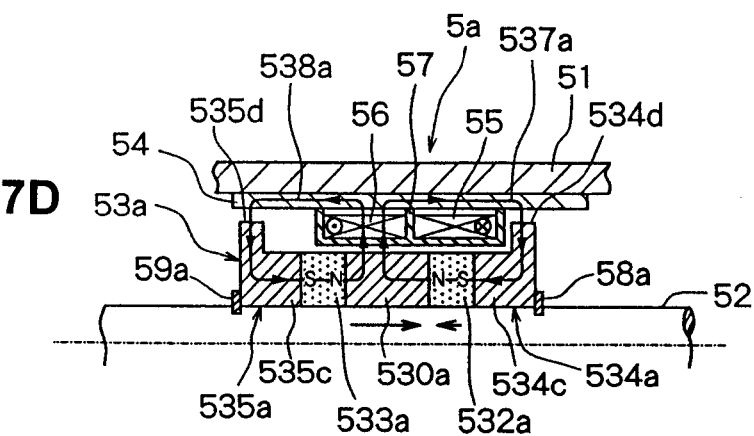

On the other hand, when the electric currents are supplied to the pair of coils 55 and 56 in the opposite directions as shown in FIG. 7(d) in a state where the operation rod 52 is moved toward the left in FIG. 6, the thrust toward the right is produced on the magnetic moving means 53a, i.e., on the operation rod 52 as indicated by an arrow in FIG. 7(d) due to the current flowing into the other coil 56, since both the first magnetic flux circuit 537 and the second magnetic flux circuit 538 are passing through the other coil 56. Thus, as the operation rod 52 moves toward the right in FIG. 7(d) and approaches the neutral position, the first magnetic flux circuit 537a formed by the permanent magnet 532a passes through one coil 55. Therefore, a thrust acts on the magnetic moving means 53a, i.e., on the operation rod 52, toward the left in FIG. 7(d) due to the electric current flowing into one coil 55. The leftward thrust due to the current flowing into one coil 55 increases as the magnetic moving means 53a, i.e., as the operation rod 52, approaches the neutral position. Then, as the magnetic moving means 53a, i.e., the operation rod 52, arrives at the neutral position, the leftward thrust due to the current flowing into one coil 55 becomes equal to the rightward thrust due to the current flowing into the other coil 56. As a result, the magnetic moving means 53a, i.e., the operation rod 52, comes into a halt at the neutral position.

In the shift actuator 5a according to the second embodiment as described above, the pair of permanent magnets 532a and 533a that constitutes the magnetic moving means 53a is disposed to hold the intermediate yoke 530a therebetween, and the N-pole is formed in the opposing end surfaces of the pair of permanent magnets 532a and 533a. Accordingly, the magnetic fluxes from the two permanent magnets 532a and 533a travel toward the pair of coils 55 and 56 while repelling each other. In the shift actuator 5a according to the second embodiment, therefore, the magnetic fluxes pass through the pair of coils 55 and 56 at right angles thereto and, hence, an increased thrust is produced on the magnetic moving means 53a, i.e., on the operation rod 52. Here, the S-pole may be formed in the end surfaces facing each other of the pair of permanent magnets 532a and 533a. Namely, it is desired that the same pole be formed in the end surfaces facing each other of the pair of permanent magnets 532a and 533a. In the shift actuator 5a of the second embodiment, further, the inner peripheral surface of the fixed yoke 54 is close to the outer peripheral surfaces of the flanges 534d and 535d of the pair of moving yokes 534a and 535a constituting the magnetic moving means 53a. Therefore, a large air gap to the magnetic flux is formed by the pair of coils 55 and 56 only. In the shift actuator 5a of the second embodiment, therefore, the air gap is minimized in the magnetic flux circuits established by the pair of permanent magnets 532a and 533a and hence, a large thrust is obtained.

In the foregoing were described the embodiments in which the invention was applied to the shift actuator that constitutes, together with the select actuator, the gear change device. The shift actuator according to the present invention can be applied also to, for example, a shift-assisting device for assisting the force of operation in the shifting direction in the manual transmissions.

The shift actuator for a transmission according to the present invention is constituted as described above, and exhibits action and effect as described below.

That is, according to the present invention, the operation rod operates based on the principle of a linear motor that is constituted by a magnetic moving means, a fixed yoke and a pair of coils. Therefore, the shift actuator features improved durability since it has no rotary mechanism and features a compact constitution and an increased operation speed since it needs no speed reduction mechanism constituted by a ball-screw mechanism or a gear that is employed by the actuator that uses an electric motor.

I claim:

1. A shift actuator for a transmission, for actuatating, in a direction of shift, a shift lever of the transmission, said shift actuator comprising:

an operation rod adapted to engage with an operation member linked to the shift lever;

a magnetic moving means disposed on the outer peripheral surface of said operation rod for linear movement therewith;

a cylindrical fixed yoke surrounding said magnetic moving means; and a pair of coils arranged on the inside of said fixed yoke neighboring each other in the axial direction, energization of said coils controlling linear movement of said magnetic moving means, and thus of said operation rod.

2. A shift actuator for a transmission according to claim 1, wherein:

said magnetic moving means comprises a moving yoke mounted on the outer peripheral surface of said operation rod, and an annular permanent magnet mounted on the outer peripheral surface of said moving yoke and having magnetic poles in the outer peripheral surface and in the inner peripheral surface thereof; and said moving yoke has a cylindrical portion on which said permanent magnet is mounted, and annular flanges formed at both ends of said cylindrical portion; the outer peripheral surfaces of said flanges being located close to the inner peripheral surface of said fixed yoke.

3. A shift actuator for a transmission A shift actuator for a transmission according to claim 1, wherein:

said magnetic moving means comprises: an intermediate yoke mounted on the outer peripheral surface of said operation rod; a pair of annular permanent magnets disposed on both sides of said intermediate yoke to hold said intermediate yoke therebetween and having magnetic poles in both end surfaces thereof in the axial direction; and a pair of moving yokes disposed each on the outer sides of said pair of permanent magnets in the axial direction thereof, and said pair of moving have yokes annular flanges with outer peripheral surfaces of located close to the inner peripheral surface of said fixed yoke.

4. A shift actuator for a transmission according to claim 3, wherein said pair of permanent magnets their opposing end surfaces magnetized into the same polarity.

\* \* \* \* \*